US009286249B2

(12) United States Patent
Li

(10) Patent No.: US 9,286,249 B2
(45) Date of Patent: Mar. 15, 2016

(54) USB DEVICE COMMUNICATION METHOD, DEVICE AND SYSTEM WHEREIN A HUMAN INTERFACE DEVICE (HID) DESCRIPTOR AND REPORT ARE ADDED TO A DRIVER OF USB DEVICE

(71) Applicant: Huawei Device Co., Ltd., Shenzhen (CN)

(72) Inventor: Shubin Li, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/331,627

(22) Filed: Jul. 15, 2014

(65) Prior Publication Data

US 2014/0330992 A1 Nov. 6, 2014

Related U.S. Application Data

(63) Continuation of application No. PCT/CN2013/070885, filed on Jan. 23, 2013.

(30) Foreign Application Priority Data

Mar. 21, 2012 (CN) .......................... 2012 1 0076403

(51) Int. Cl.
*G06F 13/00* (2006.01)
*G06F 3/00* (2006.01)
(Continued)

(52) U.S. Cl.
CPC .............. *G06F 13/10* (2013.01); *G06F 13/20* (2013.01); *G06F 13/385* (2013.01); *H04L 63/0428* (2013.01)

(58) Field of Classification Search
CPC .............................. G06F 13/10; G06F 13/385
USPC ...................................................... 710/33, 34
See application file for complete search history.

(56) References Cited

U.S. PATENT DOCUMENTS

2004/0199702 A1 10/2004 Baba
2007/0061491 A1* 3/2007 Kerdemelidis et al. .......... 710/1
2008/0066088 A1 3/2008 Lu et al.

FOREIGN PATENT DOCUMENTS

CN 1545022 A 11/2004
CN 1955890 A 5/2007
(Continued)

OTHER PUBLICATIONS

USB: Device Class Definition for Human Interface Devices (HID), Jun. 27, 2001, Version 1.11, USB Implementers' Forum; hidcomments@usb.org.*
Partial English Translation and Abstract of Chinese Patent Application No. CN102638397A, Aug. 28, 2014, 15 pages.
(Continued)

*Primary Examiner* — Tammara Peyton
(74) *Attorney, Agent, or Firm* — Conley Rose, P.C.; Grant Rodolph; Adam J. Stegge

(57) ABSTRACT

A universal serial bus (USB) device communication method that relates to the field of communications includes: receiving, by a USB device, a device type query message sent by a peer device, where a human interface device (HID) descriptor and a HID report descriptor are added to a driver of the USB device; sending, by the USB device according to the HID descriptor and HID report descriptor, a query response message that carries a HID identifier to the peer device, where the HID identifier is used to enable the peer device to identify the USB device as a HID device; and encoding and encapsulating, by the USB device, data to be sent to generate a HID packet, and sending the HID packet to the peer device, or receiving a HID packet from the peer device, and decapsulating and decoding the received HID packet, where the HID packet carries a data type and data usage manner information.

19 Claims, 4 Drawing Sheets

(51) Int. Cl.
  *G06F 13/10* (2006.01)
  *G06F 13/38* (2006.01)
  *G06F 13/20* (2006.01)
  *H04L 29/06* (2006.01)

(56) References Cited

FOREIGN PATENT DOCUMENTS

| | | |
|---|---|---|
| CN | 101763324 A | 6/2010 |
| CN | 102638397 A | 8/2012 |
| EP | 2341443 A1 | 7/2011 |
| WO | 2012009835 A1 | 1/2012 |

OTHER PUBLICATIONS

Foreign Communication From a Counterpart Application, Chinese Application No. 201210076403.5, Chinese Office Action dated Mar. 24, 2014, 5 pages.
Foreign Communication From a Counterpart Application, PCT Application No. PCT/CN2013/070885, English Translation of International Search Report dated May 2, 2013, 2 pages.
Foreign Communication From a Counterpart Application, PCT Application No. PCT/CN2013/070885, English Translation of Written Opinion dated May 2, 2013, 8 pages.
Foreign Communication From a Counterpart Application, European Application No. 13764346.6, Extended European Search Report dated Dec. 22, 2014, 7 pages.

\* cited by examiner

USB DEVICE COMMUNICATION METHOD, DEVICE AND SYSTEM WHEREIN A HUMAN INTERFACE DEVICE (HID) DESCRIPTOR AND REPORT ARE ADDED TO A DRIVER OF USB DEVICE

CROSS-REFERENCE TO RELATED APPLICATIONS

This application is a continuation of International Application No. PCT/CN2013/070885, filed on Jan. 23, 2013, which claims priority to Chinese Patent Application No. 201210076403.5, filed on Mar. 21, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications, and in particular, to a universal serial bus (USB) device communication and transmission method, device, and system.

BACKGROUND

At present, many data transmission devices support a USB transmission function. When a USB device transmits data to another device, the peer device is required to provide a USB driver, for example, a mobile phone supporting a USB transmission function may transmit data to a personal computer (PC) by using the USB transmission function, where the PC is a primary device and the mobile phone is a secondary device. Because a USB driver can be installed on the PC according to a specific USB port type, the PC and the mobile phone can transmit data to each other normally.

A human interface device (HID) device is a device that can transmit data to a peer device without requiring the peer device to provide any driver. All HID devices establish relationships with applications on peer devices by using a built-in HID device driver. The peer devices may access the HID devices by calling an application layer interface. For example, a PC uses a keyboard, a mouse, and a joystick.

However, with development of transmission devices, devices supporting an On-The-Go (OTG) function start to emerge. OTG is mainly applicable to connections between different devices or mobile devices for data transmission. Most OTG devices can function as primary devices to support data transmission with HID devices functioning as secondary devices. In the prior art, however, most USB devices are non-HID USB devices functioning as secondary devices, and therefore cannot directly communicate with OTG devices.

SUMMARY

Embodiments of the present invention provide a USB device communication method, device and system to implement communication between a non-HID USB device and an OTG device.

To achieve the foregoing purpose, the following technical solutions are adopted in the embodiments of the present invention:

A USB device communication method is provided, including: receiving, by a USB device, a device type query message sent by a peer device, where a HID descriptor and a HID report descriptor are added to a driver of the USB device; sending, by the USB device according to the HID descriptor and HID report descriptor, a query response message that carries a HID identifier to the peer device, where the HID identifier is used to enable the peer device to identify the USB device as a HID device; and encoding and encapsulating, by the USB device, data to be sent to generate a HID packet, and sending the HID packet to the peer device, or receiving a HID packet from the peer device, and decapsulating and decoding the received HID packet, where the HID packet carries a data type and data usage manner information.

A USB device communication method is provided, including: sending a device type query message to a USB device, where a HID descriptor and a HID report descriptor are added to a driver of the USB device; receiving a query response message that carries a HID identifier from the USB device, and identifying the USB device as a HID device according to the HID identifier; and receiving a HID packet from the USB device, decapsulating and decoding the received HID packet, or encoding and encapsulating data to be sent to generate a HID packet, and sending the HID packet to the USB device, where the HID packet carries a data type and data usage manner information.

A USB device is provided, including at least a first radio frequency module and a first processor module, where the first radio frequency module is connected to the first processor module; the first radio frequency module is configured to receive a device type query message sent by a peer device, where a HID descriptor and a HID report descriptor are added to a driver of the USB device, and configured to send a HID packet to the peer device or receive a HID packet from the peer device, where the HID packet carries a data type and data usage manner information; the first processor module is configured to generate, according to the HID descriptor and HID report descriptor, a query response message that carries a HID identifier, and send the query response message to the first radio frequency module, where the HID identifier is used to enable the peer device to identify the USB device as a HID device; and the first processor module is configured to encode and encapsulate data to be sent to generate a HID packet, and send the HID packet to the first radio frequency module, or decapsulate and decode the HID packet received by the first radio frequency module.

An OTG device is provided, including at least a second radio frequency module and a second processor module, where the second radio frequency module is connected to the second processor module; the second radio frequency module is configured to send a device type query message to a USB device, where a HID descriptor and a HID report descriptor are added to a driver of the USB device, and configured to receive a HID packet from the USB device or send a HID packet to the USB device, where the HID packet carries a data type and data usage manner information; the second processor module is configured to receive a query response message that carries a HID identifier and is sent by the USB device, and identify the USB device as a HID device according to the HID identifier; and the second processor module is configured to decapsulate and decode the HID packet received by the second radio frequency module, or encode and encapsulate data to be sent to generate a HID packet, and then send the HID packet to the second radio frequency module.

A USB device communications system is provided, including the foregoing USB device and OTG device.

In a USB device communication and transmission method, device and system provided by embodiments of the present invention, a driver of a USB device is changed to enable the USB device to be virtualized into a HID device, and a data processing program is separately set in the USB device and an OTG device, so as to implement communication between the OTG device functioning as a primary device and the USB device, and expand a usage scope of the USB device.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
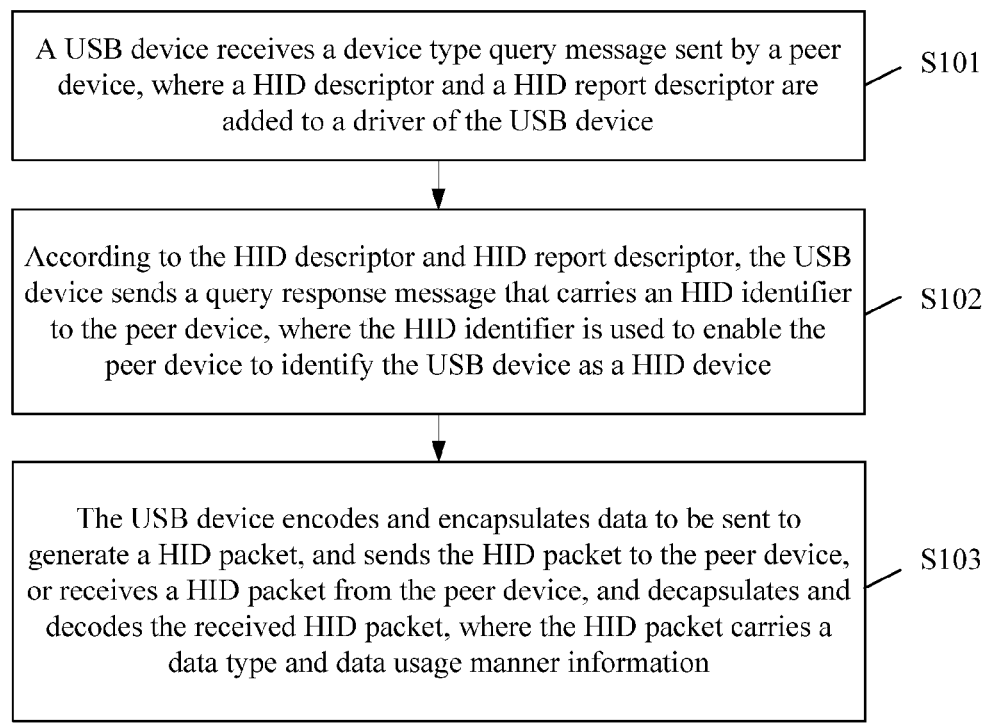
FIG. 1 is a flowchart of a method according to an embodiment of the present invention.

An embodiment of the present invention provides a USB device communication method. As shown in FIG. 1, the method includes the following steps:

S101. A USB device receives a device type query message sent by a peer device, where a HID descriptor and a HID report descriptor are added to a driver of the USB device.

The method in this embodiment is mainly applicable to communication of USB devices. When the USB device transmits data to another device, the peer device is required to provide a USB driver; otherwise, a connection cannot be established. With development of transmission devices, devices supporting an OTG function start to emerge. OTG is mainly applicable to connections between different devices or mobile devices for data transmission. An OTG device can function as a primary device to support data transmission with a HID device functioning as a secondary device. A HID device is a device that can transmit data to the peer device, without requiring the peer device to provide any driver. All HID devices establish relationships with applications of peer devices by using a built-in HID device driver. The peer devices may access the HID devices by calling an application layer interface. Therefore, in this embodiment of the present invention, the USB device is changed into a HID device to implement communication with the OTG device.

It should be noted that after a USB device is changed into a HID device and communicates with a peer device, the peer device may be a PC or an OTG device. The USB device mainly refers to a device that complies with USB protocol transmission, for example, a mobile phone and a Moving Pictures Expert Group 4 (MP4) with a USB port. In this embodiment of the present invention, an example in which an OTG device communicates with a USB device is used for specific description.

When the USB device is connected to the OTG device by using a data cable, the OTG device performs a query on a device type to check whether a type of the connected peer device is a device type that supports communication. Therefore, the OTG device first sends a device type query message to the peer device. After receiving the device type query message sent by the OTG device, the USB device responds to the message.

In this embodiment of the present invention, the USB device communicates with another device according to a USB protocol. The USB protocol defines a set of fixed-structure descriptors for describing device functions and attributes for a USB device, including a standard descriptor (namely, a device descriptor), a configuration descriptor, an interface descriptor, an endpoint descriptor, a character string descriptor, and the like. The USB device reports various attributes of the device to a USB host by using these descriptors. By accessing these descriptors, the host identifies a device type, configures the device, and provides a corresponding client driver for the device. Because a HID device supports descriptors of the USB device, to enable the USB device to communicate with a non-HID device, a HID descriptor and a HID report descriptor are added to a driver of the USB device, so that a USB device protocol is changed into a HID device protocol.

The HID descriptor includes information about a HID version number, a country code, and a report descriptor or a physical descriptor, including nine basic fields. Table 1 shows a specific structure of a HID descriptor.

TABLE 1

Structure of a HID descriptor

| Offset | Field | Number of bytes | Value type | Description |
| --- | --- | --- | --- | --- |
| 0 | bLength | 1 | Digit | Number of bytes of the descriptor |
| 1 | bDecriptorType | 1 | Constant | Type of the descriptor (which should be 0x21, that is, HID descriptor) |
| 2 | bcdHID | 2 | BCD code | Version number of HID specification |
| 4 | bCountryCode | 1 | Digit | Country code of a hardware device |

TABLE 1-continued

Structure of a HID descriptor

| Offset | Field | Number of bytes | Value type | Description |
|---|---|---|---|---|
| 5 | bNumDescriptors | 1 | Digit | Number of category descriptors (at least one report descriptor is provided) |
| 6 | bDescriptorType | 1 | Constant | Type of category descriptor |
| 7 | WDescriptorLength | 2 | Digit | Total length of a report descriptor |

In the preceding table, bcdHID indicates a version number of a HID specification with which the descriptor complies. A value of bcdHID is four 16-bit characters in a binary-coded decimal (BCD) format.

bCountryCode indicates a country identification code of a hardware device. The field is 0 unless otherwise specified.

bDescriptorType indicates a type of a descriptor to which the HID descriptor is attached. Each HID device supports at least one report descriptor.

The HID report descriptor describes a format used for data exchange between a HID device and a peer device. The format enables the peer device to decapsulate a HID packet by following a same rule. Composition of the HID report descriptor is a collection of all data items (Item). Data items are classified into three categories: main items, global items, and regional items.

Three volume labels, namely input, output, and feature in a main item are used to indicate a type of data in a report. The volume labels are major items in the report descriptor, and other items are used to modify the three items. In a report descriptor, input, output, and feature indicate information about data transmitted by the HID device, such as a length and a data type. Specifically, input indicates a data mode used to input an operation of the HID device to a peer device; output indicates a data format of an operation output by the peer device to the HID device; and feature is used to describe configuration information sent by the peer device to the HID device. The peer device may send and receive the configuration information by using SetReport and GetReport.

A global item describes a data item defined in the report descriptor and indicates some features of the data item, for example, a maximum value and a minimum value of data, a report size, and a count.

A regional item defines other features of data in the report descriptor. The regional item functions only in a current main data item and does not function when it encounters a new main data item.

Therefore, after receiving the HID packet from the USB device, the peer device, namely, the OTG device, may process HID data and send the data to the HID device.

S102. According to the HID descriptor and HID report descriptor, the USB device sends a query response message that carries a HID identifier to the peer device, where the HID identifier is used to enable the peer device to identify the USB device as a HID device.

In this embodiment of the present invention, the HID descriptor and the HID report descriptor are added to the driver of the USB device to enable the USB device to communicate with a device supporting the HID type. Therefore, according to the HID descriptor and HID report descriptor, the USB device sends the query response message that carries the HID identifier to the OTG device.

The HID identifier may be a code value that is set in a byte, for example, if a type code of a HID device type is 03H, a bInterfaceClass field of the interface descriptor may be set to 03H. Specifically, when the USB device is defined as a HID device, values of typical fields in its device descriptors are as follows:

```
bDeviceClass=0;
bDeviceSubClass=0;
Interface descriptor:
bInterfaceClass=03H;
bInterfaceSubClass=0 or 1.
```

For a HID device, a bDeviceClass field and a bDeviceSubClass field of the device descriptor are 0, and a bInterfaceClass field of the interface descriptor is 03, indicating that an interface of the device is of a HID device type.

After the USB device is changed into a HID device and the USB device receives a device type query message from the peer device, the USB device sends the query response message that carries the HID identifier to the peer device. The HID identifier may be a byte that is set in the message and is used to identify the USB device as a HID device. When receiving the query response message that carries the HID identifier, the OTG device identifies the USB device as a HID device, so as to normally perform a process such as packet sending.

S103. The USB device encodes and encapsulates data to be sent to generate a HID packet, and sends the HID packet to the peer device, or the USB device receives a HID packet from the peer device, and decapsulates and decodes the received HID packet, where the HID packet carries a data type and data usage manner information.

In this embodiment of the present invention, a HID packet refers to a packet having a HID data sending format, where the HID packet carries a data type and data usage manner information.

After the USB device and the OTG device complete an identification process, data transmission begins. In this embodiment of the present invention, data is transmitted by using a packet. Specifically, data may be transmitted in two manners: the first manner may be that the OTG device transmits data and the USB device receives the data; and the second manner may be that the USB device transmits data and the OTG device receives the data.

In the first manner, an example in which the USB device transmits data and the OTG device receives the data is used for description.

The USB device encodes and encapsulates the data to be sent to generate the HID packet and transmits the HID packet to the peer device (OTG device), where the HID packet carries the data type and data usage manner information. The encoding and encapsulating data to be sent includes: first, encoding, by the USB device, the data to be sent to generate a first packet that carries a data type and data usage manner information; and then, encapsulating, by the USB device, the first packet according to the HID report descriptor added to the driver of the USB device, to generate the HID packet that carries the data type and the data usage manner information.

The HID packet carries the data type and the data usage manner information, so that the OTG device acquires the carried data type and data usage manner information after receiving and decoding the HID packet, and stores or applies data in the HID packet according to the data type and the data usage manner information. It should be noted that storing or applying data in the HID packet may be implemented by using a piece of application software installed on the USB device and the OTG device, for example, an Android package (APK) program. Exemplarily, a specific application may be viewing image data or playing an audio file, or the like, which, however, is not limited thereto and may also be set according to an actual application requirement.

Preferably, before the encoding and encapsulating, by the USB device, data to be sent to generate a HID packet, and sending the HID packet to the peer device (OTG device), the method further includes sending a data transmission request message to the peer device (OTG device) and starting a process of encoding and encapsulating the data to be sent.

After the USB device and the OTG device complete sending a device type query message and before the USB device sends HID data to the OTG device, the USB device may send the data transmission request message to the OTG device and start the process of encoding and encapsulating the data to be sent. In this method, a data encoding and encapsulation process of the USB device may be properly started so that the process is not started when the process is not required, which effectively reduces power consumption of the USB device and saves memory of the USB device.

In the second manner, an example in which the OTG device transmits data and the USB device receives the data is used for description.

The USB device receives the HID packet from the peer device (OTG device), decapsulates and decodes the received HID packet, where the HID packet carries a data type and data usage manner information. Specifically, the decapsulating and decoding the received HID packet includes: according to the HID report descriptor added to the driver of the USB device, decapsulating the received HID packet to obtain a second packet that carries a data type and data usage manner information; and decoding the second packet that carries the data type and the data usage manner information to obtain the data type and the data usage manner information of the second packet.

Preferably, after the obtaining the data type and the data usage manner information of the second packet, the second packet may also be stored or applied according to the data type and the data usage manner information.

Because the HID descriptor and the HID report descriptor are added to the driver of the USB device, the USB device may decode the acquired HID packet, acquire information about the packet, and store or apply the received HID packet according to the data type and the data usage manner information of the HID packet in the information about the packet. Exemplarily, a specific application may be viewing image data or playing an audio file, or the like, which, however, is not limited thereto and may also be set according to an actual application requirement.

Preferably, before the receiving a HID packet from the peer device, and decapsulating and decoding the received HID packet, the method further includes starting a process of decapsulating and decoding the HID packet after the data transmission request message sent by the peer device is detected.

After the USB device and the OTG device complete sending a device type query message, and before the USB device decapsulates and decodes the received HID packet, the USB device may start the process of decapsulating and decoding the HID packet after the data transmission request message sent by the OTG device is detected. In this method, a data decapsulation and decoding process of the USB device may be properly started so that the process is not started when the process is not required, which effectively reduces power consumption of the USB device and saves memory of the USB device.

Figure 2:
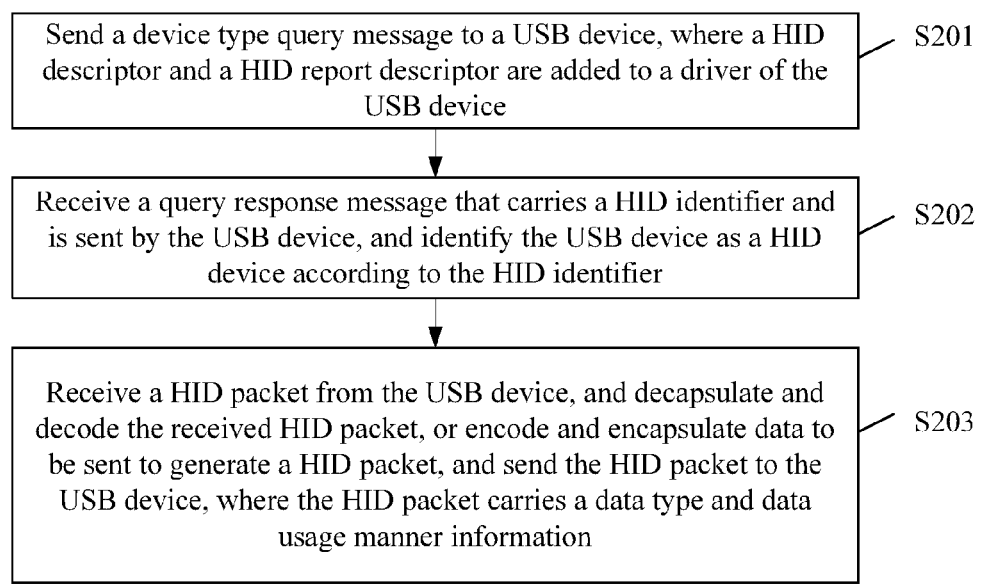
FIG. 2 is a flowchart of another method according to an embodiment of the present invention.

An embodiment of the present invention further provides another USB device communication method. As shown in FIG. 2, the method includes the following steps:

S201. Send a device type query message to a USB device, where a HID descriptor and a HID report descriptor are added to a driver of the USB device.

The method in this embodiment of the present invention is mainly applicable to communication of USB devices. When the USB device transmits data to another device, the peer device is required to provide a USB driver; otherwise, a connection cannot be established. With development of transmission devices, devices supporting an OTG function start to emerge. OTG is mainly applicable to connections between different devices or mobile devices for data transmission. An OTG device can function as a primary device to support data transmission with a HID device functioning as a secondary device. A HID device is a device that can transmit data to the peer device, without requiring the peer device to provide any driver. All HID devices establish relationships with applications of peer devices by using a built-in HID device driver. The peer devices may access the HID devices by calling an application layer interface. Therefore, in this embodiment of the present invention, the USB device is changed into a HID device to implement communication with the OTG device.

It should be noted that after a USB device is changed into a HID device and communicates with a peer device, the peer device may be a PC or an OTG device. The USB device mainly refers to a device that complies with USB protocol transmission, for example, a mobile phone and an MP4 with a USB port. In this embodiment of the present invention, an example in which an OTG device communicates with a USB device is used for specific description.

When the USB device is connected to the OTG device by using a USB data cable, the OTG device performs a query on a device type to check whether a type of the connected peer device is a device type that supports communication. Therefore, the OTG device first sends a device type query message to the USB device.

S202. Receive a query response message that carries a HID identifier and is sent by the USB device, and identify the USB device as a HID device according to the HID identifier.

In this embodiment of the present invention, after the USB device is changed into the HID device and the USB device receives the device type query message from the OTG device, the USB device sends the query response message that carries the HID identifier to the peer device. The HID identifier may be a byte that is set in the message and is used to identify the USB device as a HID device. When receiving the query response message that carries the HID identifier, the OTG device identifies the USB device as a HID device.

S203. Receive a HID packet from the USB device, and decapsulate and decode the received HID packet, or encode and encapsulate data to be sent to generate a HID packet, and send the HID packet to the USB device, where the HID packet carries a data type and data usage manner information.

In this embodiment of the present invention, a HID packet refers to a packet having a HID data sending format, where the HID packet carries a data type and data usage manner information.

After the USB device and the OTG device complete an identification process, data transmission begins. In this embodiment of the present invention, data is transmitted by using a packet. Specifically, data may be transmitted in two manners: the first manner may be that the USB device transmits data and the OTG device receives the data; and the second manner may be that the OTG device transmits data and the USB device receives the data.

In the first manner, an example in which the USB device transmits data and the OTG device receives the data is used for description.

The OTG device receives the HID packet from the USB device, and decapsulates and decodes the received HID packet, where the HID packet carries the data type and the data usage manner information. The decapsulating and decoding the received HID packet includes: first, decapsulating, by the OTG device, the HID packet to obtain a third packet that carries a data type and data usage manner information; and then, decoding, by the OTG device, the third packet that carries the data type and the data usage manner information to obtain the data type and the data usage manner information of the third packet.

Preferably, after the obtaining the data type and the data usage manner information of the third packet, the method further includes storing or applying the received HID packet according to the data type and the data usage manner information.

The HID packet carries the data type and the data usage manner information so that, after receiving the HID packet, the OTG device stores or applies data in the HID packet according to the data type and the data usage manner information in the HID packet. Exemplarily, a specific application may be viewing image data or playing an audio file, or the like, which, however, is not limited thereto and may also be set according to an actual application requirement.

Preferably, before the receiving a HID packet from the USB device, and decapsulating and decoding the received HID packet, the method further includes starting a process of decapsulating and decoding the HID packet after the data transmission request message sent by the USB device is detected.

After the OTG device and the USB device complete sending a device type query message, and before the OTG device decapsulates and decodes the received HID packet, the OTG device may start a process of decapsulating and decoding the HID packet after the data transmission request message sent by the USB device is detected. In this method, a data decapsulation and decoding process of the OTG device may be properly started so that the process is not started when the process is not required, which effectively reduces power consumption of the OTG device and saves memory of the OTG device.

In the second manner, an example in which the USB device transmits data and the OTG device receives the data is used for description.

The OTG device encodes and encapsulates the data to be sent to generate the HID packet and transmits the HID packet to the USB device, where the HID packet carries a data type and data usage manner information. The encoding and encapsulating data to be sent includes: first, encoding, by the OTG device, the data to be sent to generate a fourth packet that carries a data type and data usage manner information; and then, encapsulating, by the OTG device, the fourth packet, to generate the HID packet that carries the data type and the data usage manner information.

Because the OTG device has an OTG platform to process a function, the OTG device encapsulates the fourth packet to enable the fourth packet to carry the data type and the data usage manner information, and transmits the fourth packet to the USB device, so that the USB device can decode the acquired HID data, acquire the data type and the data usage manner information, and store or apply the received HID packet according to the data type and the data usage manner information. It should be noted that storing or applying data in the HID packet may be implemented by using a piece of application software installed on the USB device and OTG device, for example, an APK program. Specifically and exemplarily, a specific application for storing or applying data in the HID packet may be viewing image data or playing an audio file, or the like, which, however, is not limited thereto and may also be set according to an actual application requirement.

Preferably, before the encoding and encapsulating data to be sent to generate a HID packet, and sending the HID packet to the USB device, the method further includes sending a data transmission request message to the USB device and starting a process of encoding and encapsulating the data to be sent.

After the OTG device and the USB device complete sending a device type query message and before the OTG device sends HID data to the USB device, the OTG device may send the data transmission request message to the USB device and start a process of encoding and encapsulating the data to be sent. In this method, a data encoding and encapsulation process of the OTG device may be properly started so that the process is not started when the process is not required, which effectively reduces power consumption of the OTG device and saves memory of the OTG device.

In a USB device communication and transmission method provided by this embodiment of the present invention, a driver of a USB device is changed to enable the USB device to be virtualized into a HID device, and a data processing program is separately set in the USB device and an OTG device, so as to implement communication between the OTG device functioning as a primary device and the USB device, and expand a usage scope of the USB device.

Figure 3:
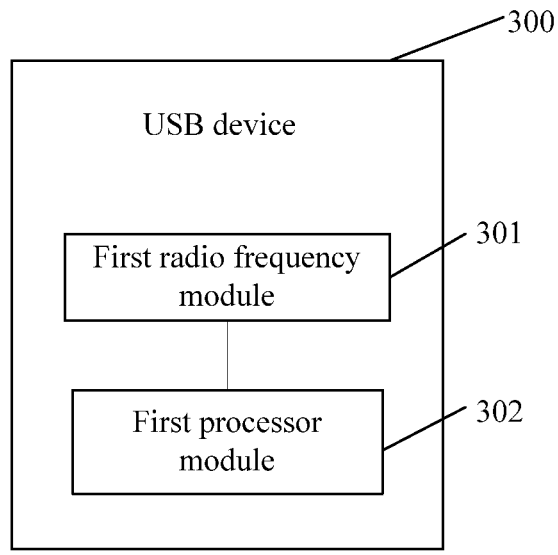
FIG. 3 is a schematic structural diagram of a USB device according to an embodiment of the present invention.

As shown in FIG. 3, an embodiment of the present invention further provides a USB device 300, including at least a first radio frequency module 301 and a first processor module 302, where the first radio frequency module 301 is connected to the first processor module 302.

The first radio frequency module 301 is configured to receive a device type query message sent by a peer device, where a HID descriptor and a HID report descriptor are added to a driver of the USB device; and send a HID packet to the peer device or receive a HID packet from the peer device, where the HID packet carries a data type and data usage manner information.

The first processor module 302 is configured to send, according to the HID descriptor and HID report descriptor, a query response message that carries a HID identifier to the peer device, where the HID identifier is used to enable the peer device to identify the USB device as a HID device.

The first processor module 302 is configured to encode and encapsulate data to be sent to generate a HID packet, and send the HID packet to the first radio frequency module, or decapsulate and decode the HID packet received by the first radio frequency module.

In this embodiment of the present invention, when the data to be sent is encoded and encapsulated to generate the HID packet, the first processor module 302 is specifically configured to encode the data to be sent to generate a first packet that carries a data type and data usage manner information; and encapsulate the first packet according to the HID report descriptor added to the driver of the USB device, to generate the HID packet that carries the data type and the data usage manner information.

In addition, when the received HID packet is decapsulated and decoded, the first processor module 302 is specifically configured to decapsulate the received HID packet according to the HID report descriptor added to the driver of the USB device and acquire a second packet that carries the data type and the data usage manner information; and decode the second packet that carries the data type and the data usage manner information and acquire the data type and data usage manner information of the second packet.

Preferably, the first processor module 302 is further configured to store or apply the second packet according to the data type and the data usage manner information.

Preferably, the first processor module 302 is further configured to send a data transmission request message to the peer device and start a process of encoding and encapsulating the data to be sent; and start a process of decapsulating and decoding the HID packet after the data transmission request message sent by the peer device is detected.

Figure 4:
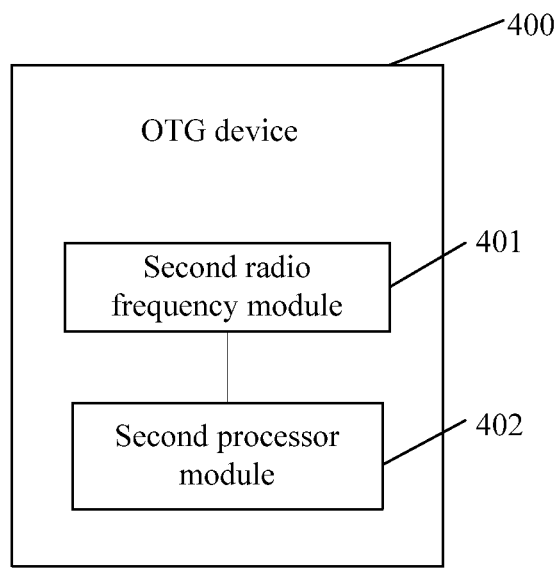
FIG. 4 is a schematic structural diagram of an OTG device according to an embodiment of the present invention.

As shown in FIG. 4, an embodiment of the present invention further provides an OTG device 400, including at least a second radio frequency module 401 and a second processor module 402, where the second radio frequency module 401 is connected to the second processor module 402.

The second radio frequency module 401 is configured to send a device type query message to a USB device, where a HID descriptor and a HID report descriptor are added to a driver of the USB device, and receive a HID packet from the USB device or send a HID packet to the USB device, where the HID packet carries a data type and data usage manner information.

The second processor module 402 is configured to receive a query response message that carries a HID identifier and is sent by the USB device, and identify the USB device as a HID device according to the HID identifier.

The second processor module 402 is configured to decapsulate and decode the HID packet received by the second radio frequency module, or encode and encapsulate data to be sent to generate a HID packet, and send the HID packet to the second radio frequency module.

In this embodiment of the present invention, when the received HID packet is decapsulated and decoded, the second processor module 402 is specifically configured to decapsulate the HID packet and acquire a third packet that carries a data type and data usage manner information; and decode the third packet that carries the data type and the data usage manner information and acquire the data type and the data usage manner information of the third packet.

In addition, when the data to be sent is encoded and encapsulated to generate the HID packet, the second processor module 402 is specifically configured to encode the data to be sent to generate a fourth packet that carries the data type and the data usage manner information; and encapsulate the fourth packet to generate a HID packet that carries the data type and the data usage manner information.

Preferably, the second processor module is further configured to store or apply the received HID packet according to the data type and data usage manner information.

Preferably, the second processor module is further configured to start a process of decapsulating and decoding the HID packet after the data transmission request message sent by the USB device is detected; and send the data transmission request message to the USB device and start a process of encoding and encapsulating the data to be sent.

Figure 5:
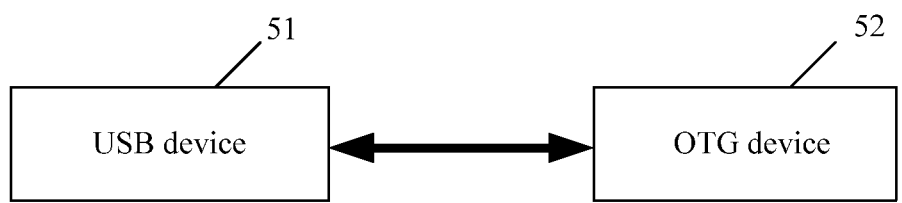
FIG. 5 is a schematic structural diagram of a system according to an embodiment of the present invention.

As shown in FIG. 5, an embodiment of the present invention further provides a USB device communications system, including a USB device 51 and an OTG device 52, where a structure of the USB device and apparatus and a function and a structure of the OTG device are the same as those of the foregoing devices, and details are not described herein again.

In a USB device communications and transmission system provided by this embodiment of the present invention, a driver of a USB device is modified to enable the USB device to be virtualized into a HID device, and a data processing program is separately set in the USB device and an OTG device, so as implement communication between the OTG device functioning as a primary device and the USB device, and expand a usage scope of the USB device.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random-access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A universal serial bus (USB) device communication method, comprising:
    receiving, by a USB device, a device type query message sent by a peer device, wherein a human interface device (HID) descriptor and a HID report descriptor are added to a driver of the USB device, and wherein the HID descriptor comprises at least one descriptor type and a HID version indicator;
    sending, by the USB device according to the HID descriptor and the HID report descriptor, a query response message that carries a HID identifier to the peer device, wherein the HID identifier is used to enable the peer device to identify the USB device as a HID device,
    wherein the method further comprises either:
        encoding and encapsulating, by the USB device, data to be sent to generate a HID packet, and sending the HID packet to the peer device; or
        receiving the HID packet from the peer device, and decapsulating and decoding the received HID packet, and
    wherein the HID packet carries a data type and data usage manner information.

2. The method according to claim 1, wherein encoding and encapsulating the data to be sent to generate the HID packet comprises:
    encoding the data to be sent to generate a first packet that carries the data type and the data usage manner information; and encapsulating the first packet, according to the HID report descriptor of the USB driver of the USB device, to generate the HID packet that carries the data type and the data usage manner information.

3. The method according to claim 1, wherein decapsulating and decoding the received HID packet comprises:
decapsulating the received HID packet, according to the HID report descriptor of the USB driver of the USB device, to obtain a second packet that carries the data type and the data usage manner information; and
decoding the second packet that carries the data type and the data usage manner information to obtain the data type and the data usage manner information of the second packet.

4. The method according to claim 1, wherein before encoding and encapsulating the data to be sent to generate the HID packet, and sending the HID packet to the peer device, the method further comprises:
sending a data transmission request message to the peer device; and
starting a process of encoding and encapsulating the data to be sent.

5. The method according to claim 1, wherein before receiving the HID packet from the peer device, and decapsulating and decoding the received HID packet, the method further comprises starting a process of decapsulating and decoding the HID packet after a data transmission request message sent by the peer device is detected.

6. A universal serial bus (USB) device communication method, comprising:
sending a device type query message to the USB device, wherein a human interface device (HID) descriptor and a HID report descriptor are added to a driver of the USB device;
receiving a query response message that carries a HID identifier and is sent by the USB device, and identifying the USB device as a HID device according to the HID identifier; and
receiving a HID packet from the USB device, and decapsulating and decoding the received HID packet, or encoding and encapsulating data to be sent to generate the HID packet, and sending the HID packet to the USB device, wherein the HID packet carries a data type and data usage manner information.

7. The method according to claim 6, wherein decapsulating and decoding the received HID packet comprises:
decapsulating the HID packet to obtain a third packet that carries the data type and the data usage manner information; and
decoding the third packet that carries the data type and the data usage manner information to obtain the data type and the data usage manner information of the third packet.

8. The method according to claim 6, wherein encoding and encapsulating the data to be sent comprises:
encoding the data to be sent to generate a fourth packet that carries the data type and the data usage manner information; and
encapsulating the fourth packet to generate a HID packet that carries the data type and the data usage manner information.

9. The method according to claim 6, wherein before receiving the HID packet from the USB device, and decapsulating and decoding the received HID packet, the method further comprises starting a process of decapsulating and decoding the HID packet after a data transmission request message sent by the USB device is detected.

10. The method according to claim 6, wherein before encoding and encapsulating data to be sent to generate the HID packet, and sending the HID packet to the USB device, the method further comprises sending a data transmission request message to the USB device and starting a process of encoding and encapsulating the data to be sent.

11. A universal serial bus (USB) device, comprising:
a first radio frequency module configured to receive a device type query message sent by a peer device; and
a first processor module connected to the first radio frequency module,
wherein a human interface device (HID) descriptor and a HID report descriptor are added to a driver of the USB device, wherein the HID descriptor comprises at least one descriptor type and a HID version indicator,
wherein the first radio frequency module is also configured to send a HID packet to the peer device or receive the HID packet from the peer device,
wherein the HID packet carries a data type and data usage manner information,
wherein the first processor module is configured to generate, according to the HID descriptor and HID report descriptor, a query response message that carries a HID identifier, and send the query response message to the first radio frequency module,
wherein the HID identifier is used to enable the peer device to identify the USB device as a HID device, and
wherein the first processor module is configured to encode and encapsulate data to be sent to generate the HID packet, and send the HID packet to the first radio frequency module, or decapsulate and decode the HID packet received by the first radio frequency module.

12. The USB device according to claim 11, wherein when encoding and encapsulating the data to be sent to generate the HID packet, the first processor module is configured to:
encode the data to be sent to generate a first packet that carries the data type and the data usage manner information; and
encapsulate the first packet, according to the HID report descriptor of the USB driver of the USB device, to generate the HID packet that carries the data type and the data usage manner information.

13. The USB device according to claim 11, wherein when decapsulating and decoding the received HID packet, the first processor module is configured to:
decapsulate the received HID packet, according to the HID report descriptor of the USB driver of the USB device, to obtain a second packet that carries the data type and the data usage manner information; and
decode the second packet that carries the data type and the data usage manner information to obtain the data type and data usage manner information of the second packet.

14. The USB device according to claim 11, wherein the first processor module is further configured to:
send a data transmission request message to the peer device and start a process of encoding and encapsulating the data to be sent; and
start a process of decapsulating and decoding the HID packet after a data transmission request message sent by the peer device is detected.

15. An On-The-Go (OTG) device, comprising:
a radio frequency module configured to send a device type query message to a universal serial bus (USB) device; and
a processor module connected to the radio frequency module, wherein a human interface device (HID) descriptor and a HID report descriptor are added to a driver of the USB device, wherein the HID descriptor comprises at least one descriptor type and a HID version indicator, wherein the radio frequency module is further configured to receive a HID packet from the USB device or send the HID packet to the USB device, wherein the HID packet carries a data type and data usage manner information, wherein the processor module is configured to receive a query response message that carries a HID identifier and is sent by the USB device, and identify the USB device as a HID device according to the HID identifier, and wherein the processor module is configured to decapsulate and decode the HID packet received by the radio frequency module, or encode and encapsulate data to be sent to generate the HID packet, and send the HID packet to the radio frequency module.

16. The OTG device according to claim 15, wherein when decapsulating and decoding the received HID packet, the processor module is configured to:
    decapsulate the HID packet to obtain a third packet that carries the data type and the data usage manner information; and
    decode the third packet that carries the data type and the data usage manner information to obtain the data type and the data usage manner information of the third packet.

17. The OTG device according to claim 15, wherein when encoding and encapsulating the data to be sent to generate the HID packet, the processor module is configured to:
    encode the data to be sent to generate a fourth packet that carries the data type and the data usage manner information; and
    encapsulate the fourth packet to generate a HID packet that carries the data type and the data usage manner information.

18. The OTG device according to claim 17, wherein the processor module is further configured to:
    start a process of decapsulating and decoding the HID packet after a data transmission request message sent by the USB device is detected; and
    send the data transmission request message to the USB device and start a process of encoding and encapsulating the data to be sent.

19. A universal serial bus (USB) device communications system, comprising:
    a USB device comprising at least a first radio frequency module and a first processor module, wherein the first radio frequency module is connected to the first processor module; and
    an On-The-Go (OTG) device,
    wherein the first radio frequency module is configured to receive a device type query message sent by a peer device,
    wherein a human interface device (HID) descriptor and a HID report descriptor are added to a driver of the USB device, wherein the HID descriptor comprises at least one descriptor type and a HID version indicator,
    wherein the first radio frequency module is also configured to send a HID packet to the peer device or receive the HID packet from the peer device,
    wherein the HID packet carries a data type and data usage manner information,
    wherein the first processor module is configured to generate, according to the HID descriptor and HID report descriptor, a query response message that carries a HID identifier, and send the query response message to the first radio frequency module,
    wherein the HID identifier is used to enable the peer device to identify the USB device as a HID device,
    wherein the first processor module is configured to encode and encapsulate data to be sent to generate the HID packet, and send the HID packet to the first radio frequency module, or decapsulate and decode the HID packet received by the first radio frequency module,
    wherein the OTG device comprises at least a second radio frequency module and a second processor module,
    wherein the second radio frequency module is connected to the second processor module,
    wherein the second radio frequency module is configured to send a device type query message to the USB device,
    wherein a HID descriptor and a HID report descriptor are added to a driver of the USB device,
    wherein the second radio frequency module is further configured to receive the HID packet from the USB device or send the HID packet to the USB device,
    wherein the HID packet carries a data type and data usage manner information,
    wherein the second processor module is configured to receive a query response message that carries a HID identifier and is sent by the USB device, and identify the USB device as a HID device according to the HID identifier, and
    wherein the second processor module is configured to decapsulate and decode the HID packet received by the second radio frequency module, or encode and encapsulate data to be sent to generate the HID packet, and send the HID packet to the second radio frequency module.

* * * * *